US007437681B2

(12) United States Patent
Misawa et al.

(10) Patent No.: US 7,437,681 B2
(45) Date of Patent: Oct. 14, 2008

(54) IMAGE DISPLAY APPARATUS AND METHOD AND IMAGE MANAGEMENT PROGRAM

(75) Inventors: Takeshi Misawa, Asaka (JP); Masahiro Terada, Asaka (JP)

(73) Assignee: Fujifilm Corporation, Tokyo (JP)

( * ) Notice: Subject to any disclaimer, the term of this patent is extended or adjusted under 35 U.S.C. 154(b) by 659 days.

(21) Appl. No.: 10/366,661

(22) Filed: Feb. 14, 2003

(65) Prior Publication Data
US 2003/0154190 A1 Aug. 14, 2003

(30) Foreign Application Priority Data
Feb. 14, 2002 (JP) ............................. 2002-036478

(51) Int. Cl.
*G06F 3/00* (2006.01)
(52) U.S. Cl. ...................................... 715/835; 715/838
(58) Field of Classification Search ................. 715/835, 715/838
See application file for complete search history.

(56) References Cited

U.S. PATENT DOCUMENTS

| | | | | | |
|---|---|---|---|---|---|
| 5,969,720 | A | * | 10/1999 | Lisle et al. | .................. 715/775 |
| 6,795,094 | B1 | * | 9/2004 | Watanabe et al. | ............ 715/762 |
| 2001/0028363 | A1 | * | 10/2001 | Nomoto et al. | ............. 345/748 |
| 2002/0095416 | A1 | * | 7/2002 | Schwols | ....................... 707/10 |
| 2002/0154178 | A1 | * | 10/2002 | Barnett et al. | ............... 345/853 |
| 2003/0076322 | A1 | * | 4/2003 | Ouzts et al. | .................. 345/440 |
| 2004/0128277 | A1 | * | 7/2004 | Mander et al. | .................. 707/1 |

FOREIGN PATENT DOCUMENTS

| JP | 2000-76281 A | 3/2000 |
|---|---|---|
| JP | 2000-244849 A | 9/2000 |

OTHER PUBLICATIONS

Shimizu et al., "Spotlight:Piled up images can now be neatly organized! Image management software programs for digital camera," DOS/V Power Resort, Japan, Impress Corporation, No. 9, vol. 9, Jul. 30, 1999, pp. 217-230.

* cited by examiner

*Primary Examiner*—Dennis-Doon Chow
*Assistant Examiner*—Ryan Pitaro
(74) *Attorney, Agent, or Firm*—Birch, Stewart, Kolasch & Birch, LLP

(57) ABSTRACT

Date and time information concerning image files included in the folder is obtained, a time range from the oldest image to the newest image is calculated, and the time range is displayed with folder information. For example, data on shot dates and times recorded as associated information concerning the images or time stamps of the files are used to calculate the time range, and the date range is displayed on a folder icon or on a tab portion of the folder icon. Moreover, a file list displayed last time is stored, the stored file list is compared with a current file list, and only if the both file lists are different from each other, the date and time information is obtained for a different file to recalculate the time range. Thus, the user can infer images included in the folder to some extent and easily retrieve a desired image.

15 Claims, 20 Drawing Sheets

FIG.2

| Name | Size | Type | Last-Modified Date and Time | File Time Range |
|------|------|------|-----------------------------|-----------------|
| 100_FUJI | 4569KB | File Folder (23 Files) | 2001/10/20 | 2001/10/01 - 10/20 |
| 101_FUJI | 339KB | File Folder (1 File) | 2001/10/26 | 2001/10/26 - 10/26 |
| 102_FUJI | 9509KB | File Folder (3 Files) | 2001/11/20 | 2001/11/01 - 11/20 |
| 103_FUJI | 1469KB | File Folder (3 Files) | 2001/12/25 | 2001/12/07 - 12/25 |
| ... | ... | | | |

IMAGE DISPLAY APPARATUS AND METHOD AND IMAGE MANAGEMENT PROGRAM

BACKGROUND OF THE INVENTION

1. Field of the Invention

The present invention relates to an image display apparatus and method and image viewer program which are preferable for a digital camera, a Personal Data Assistance (PDA) and the like, and in particular, to an image display apparatus and method and computer software for viewing an image in which the image can be retrieved and displayed among a plurality of groups of images.

2. Description of the Related Art

In general, it is broadly executed to view images recorded with a digital camera and the like, on a screen of a personal computer and the like. For example, if the images are viewed on a Windows® operating system of the personal computer (Windows® OS by Microsoft Corporation), there are several methods such as for list-displaying contents of the images as shown in FIG. 14, for list-displaying the images together with a tree display of folders as shown in FIG. 15, for displaying only the folders as shown in FIG. 16 or the like.

Although only icons of the folders are displayed in FIG. 16, it is also possible to display details of the folders as shown in FIG. 17. However, in this detailed display, only a name (folder name), a type and a last-modified date (a date when the file was created) are shown, and such information are not shown as the number of files in the folder and a byte count of a total size of the file.

On the other hand, an image display apparatus mounted on the digital camera and the like has a single display mode for displaying a single image recorded on a storage medium in one frame, and a list-display mode for displaying a plurality of images simultaneously with thumbnails (reduced images) in one screen, so that a display form for playback may be switched properly. However, due to a small display screen on the digital camera, only a multi-screen display is performed as shown in FIG. 18 for list-displaying the images, or only such a display as shown in FIG. 19 is performed for list-displaying only the folder information.

However, with the display methods as shown in FIGS. 17 or 19, though a list of the folders is displayed, it has been so difficult for the user to understand what picture is included in which folder.

From such a point of view, a program attached with a function of displaying a capacity (size) of the folder as shown in FIG. 20 has been proposed. Japanese Patent Application Publication No. 2000-244849 discloses an image playback apparatus in which a representative image is automatically set among recorded groups of images so that a desired image may be retrieved efficiently. Japanese Patent Application Publication No. 2000-76281 discloses an image filing method and apparatus in which a plurality of representative images (for example, four images) among the images included in a folder are combined to create a summary image so that the images in the folder may be easily understood.

Furthermore, in image viewer software "Photo Loader" by Casio Computer Co., Ltd., a function is realized in which images recorded with a digital camera are divided into a folder for each shot date and the total number of image files included in a selected folder is displayed.

It is useful information for the user to display the size of the folder or the total number of files in the folder; however, it is not sufficient information to retrieve the desired image.

SUMMARY OF THE INVENTION

The present invention has been made in view of these circumstances and an object of the present invention is to provide an image display apparatus and method and an image management program in which the user can infer the images included in the folder to some extent and easily retrieve the desired image.

To attain the above object, the present invention is directed to an image display apparatus which displays information concerning folders in which image files are included to receive an instruction for selecting a folder, and displays images included in the selected folder, the image display apparatus comprising: a date and time information obtaining device which obtains date and time information concerning the images included in the folder; a calculating device which calculates a time range from an oldest image to a newest image in the folder according to the date and time information obtained by the date and time information obtaining device; and a display control device which displays information indicating the time range calculated by the calculating device.

The present invention is also directed to a method for displaying, on a display, information concerning folders in which image files are included, the method comprising the steps of: obtaining date and time information concerning images included in the folder; calculating a time range from an oldest image to a newest image in the folder according to the date and time information obtained in the obtaining step; and displaying, on the display, information indicating the time range calculated in the calculating step.

According to the present invention, on a screen for displaying the folders in which the image files are included, information indicating the time range of a group of the images included in each folder is displayed as a part of the folder information, so that the user can infer the images included in the folder to some extent according to the time range information. Thereby it may be possible to relatively easily retrieve a desired image.

As display forms of the "time range", there are several kinds of display forms such as a date range display, a time range display, a date and time range display and the like, and the date range display is particularly preferred. An aspect is also preferred in which the time range information concerning the images included in the folder is displayed together with the number of the image files in the folder.

In the present invention, as a method for automatically calculating the time range of the images in the folder, for example, there are an aspect for using data on shot dates and times recorded as associated information concerning the images, and an aspect for using time stamps of the files.

As a specific display method, for example, there are an aspect for displaying the time range in a main section on a folder icon, an aspect for displaying the time range in a tab portion on the folder icon and the like.

The present invention is also directed to an image management program for causing a computer to realize a function of displaying, on a display, information concerning folders in which image files are included, the image management program comprising the functions executed by the computer of: obtaining date and time information concerning images included in the folder; calculating a time range from an oldest image to a newest image in the folder according to the date and time information obtained by the obtaining function; and displaying, on the display, information indicating the time range calculated by the calculating function.

According to the present invention, the date and time information concerning the images included in each folder is automatically obtained, the time range of the images included in the folder is calculated, and the time range information is displayed as a part of the folder information, so that the user can infer the images in the folder to some extent and thereby it may be possible to relatively easily retrieve the desired image.

Preferably, the image management program further comprises the functions executed by the computer of: storing data of the time range and a file list of the images included in the folder for which the time range is calculated; and comparing a current file list with the stored file list, and if the both file lists are identical, displaying the time range using the stored data, while if the both file lists are different from each other, obtaining date and time information concerning the images only for a different file and recalculating the time range using at least one of the stored file list and time range.

If the time range is calculated each time the folder information is displayed, it may take too much time to display the time range. It is hence preferable that the file list and the time range information for the last display are stored in the storage device such that when the display of the folder information is requested next time, the current file list and the stored file list are compared and only if there is any change, the date and time information is newly obtained for the different file to recalculate the time range. Thereby, an operation load is reduced and a process of displaying the time range may be quicker.

It should be noted that the image management program of the present invention may be configured as single application software or may be incorporated as a part of an application such as browser software, file management software and the like.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 shows a display example of folder information;

FIG. 3 shows another display example of the folder information with the image management program which the present invention is applied to;

FIG. 4 shows a block diagram of an electronic camera which the present invention is applied to;

DETAILED DESCRIPTION OF THE PREFERRED EMBODIMENTS

Preferred embodiments of an image display apparatus and an image management program according to the present invention will be described below according to the accompanying drawings.

Figure 1:
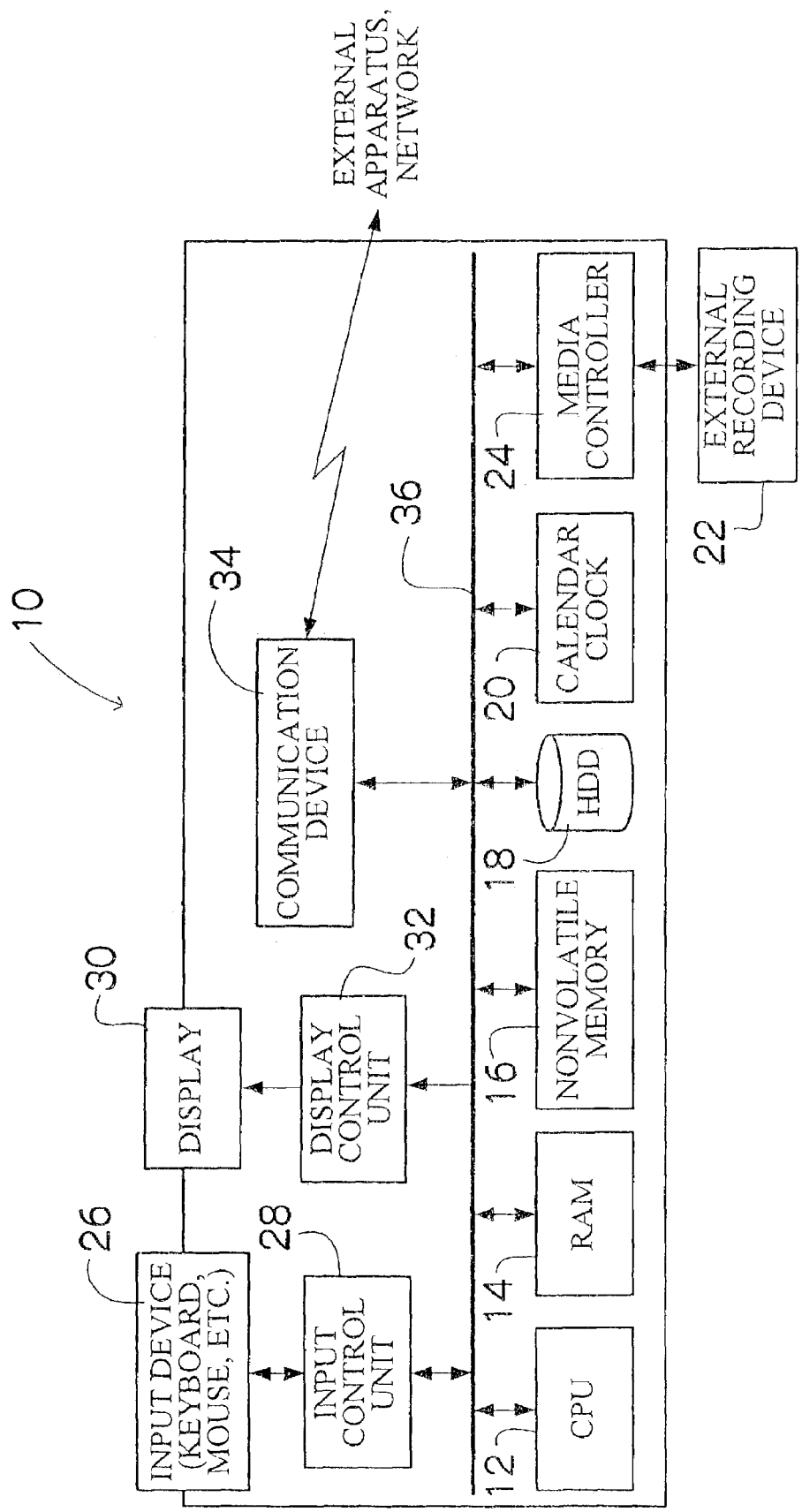
FIG. 1 shows a block diagram of a hardware configuration example of a personal computer having an image management program according to an embodiment of the present invention incorporated therein.

FIG. 1 shows a block diagram of a hardware configuration example of a personal computer having an image management program according to the present invention incorporated therein. As shown in FIG. 1, a personal computer 10 comprises: a CPU 12 for functioning as a controller and an arithmetic unit; a RAM 14 used as a temporary storage for data or a working area during the execution of a program by the CPU 12; a rewritable nonvolatile memory 16 for storing programs or various kinds of setting values required for operations by the CPU 12, network connection information and the like; a hard disk unit 18 for storing an operating system (OS) of the personal computer 10, the image management program according to an embodiment of the present invention, various kinds of application software, image files recorded by the user and the like; a calendar clock 20 for keeping date and time; a media control unit 24 for controlling reading and writing of an external recording device 22 such as a memory card and a magneto-optic disk; an input device 26 such as a keyboard and a mouse; an input control unit 28 for controlling a signal input by the input device 26; a display 30 for displaying images, characters and the like; a display control unit 32 for outputting a signal for displaying to the display 30; a communication device 34 for connecting to an external apparatus or a connection network according to a predetermined communication mode such as a USB and a wireless LAN; and a bus 36 for connecting the above described respective components to one another.

It should be noted that the personal computer 10 configured as described above is well known except the image management program according to the present invention, therefore a detailed description of each component will be eliminated.

Next, the image management program according to an embodiment of the present invention will be described below.

This image management program is provided for operating the personal computer 10 to enable the user to view the image files stored in the hard disk unit 18 or the external recording device 22, or the image files stored in the external apparatus connected through the communication device 34.

When the above described image management program is activated, a window (application screen) of the above described image management program is displayed on the display 30. On this application screen, when the user selects a drive of an image archiving location, information concerning folders stored in the selected drive is displayed.

FIG. 2 shows a display example of the folder information. For example, it is assumed that tinder a certain folder in the hard disk unit 18, a plurality of image files are divided and recorded into the folders such as "100_FUJI", "101_FUJI", . . . and the like. Of course, names of the folders are not limited to them, but may be set properly.

When the folder information is list-displayed, as shown in FIG. 2, a folder name (name), a size, a type, a last-modified date and time and a file time range are displayed for each folder.

In a "Type" column, the total number of the image files included in the folder (the number of the images) is also shown. The file time range is information indicating the time range from the oldest image to the newest image in the folder, and in this example, a date range is displayed in a display form of "year/month/date-year/month/date".

The file time range is automatically calculated from date and time data attached to the image files. For example, in an image file generated according to an Exif (Exchangeable Image File Format) file format, information indicating shot date and time of a main image is recorded as associated information (tag information). The CPU 12 may understand the time range from the oldest image to the newest image in the folder by reading the associated information concerning the images in the folder. The CPU 12 also may understand the time range using time stamps automatically recorded on the image files when they are created.

As described above, since the number of the images and the file time range in each folder are displayed in a folder list-display screen, the user can easily infer the images in the folder and easily retrieve a desired image.

Figure 3:
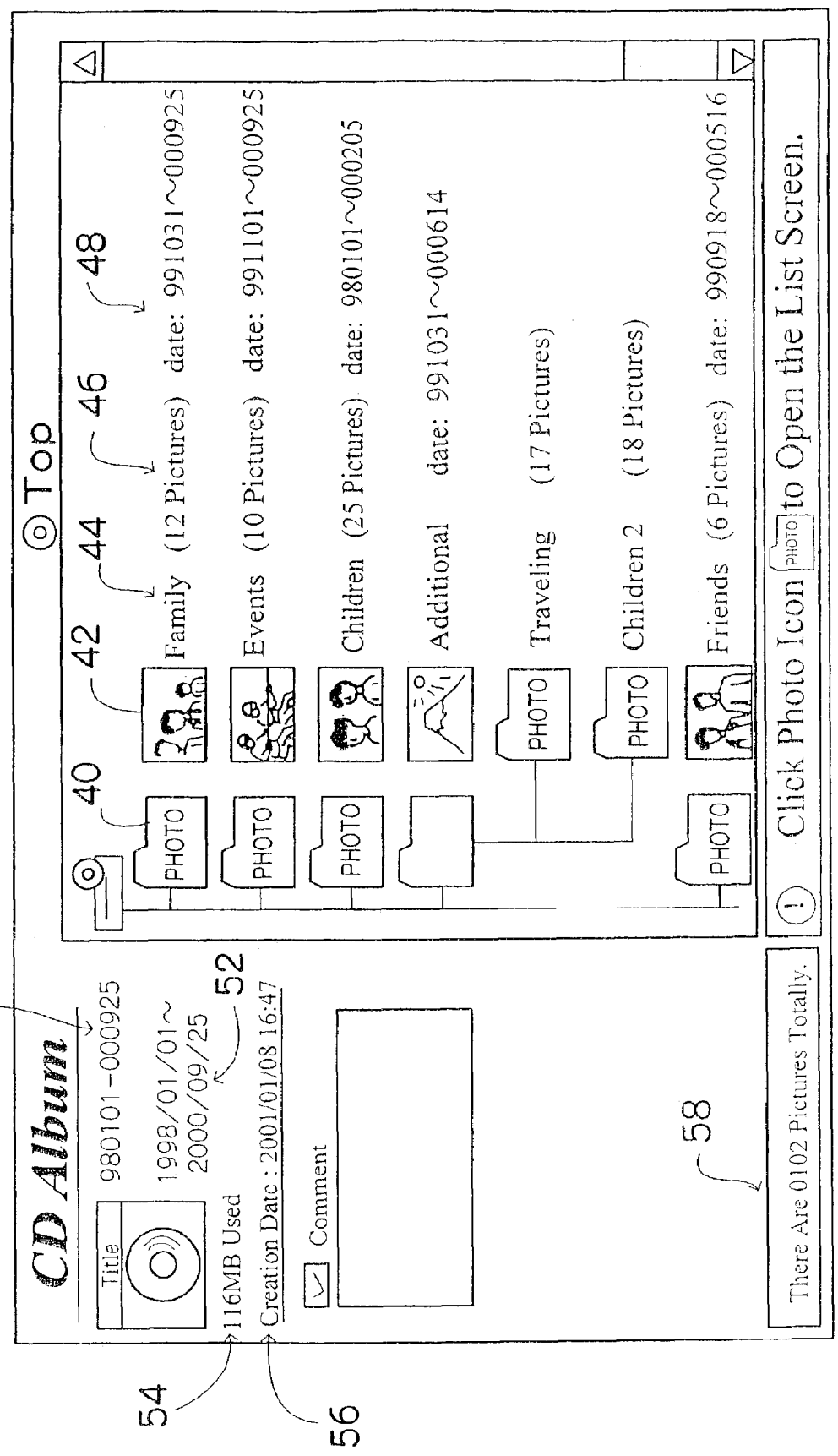

FIG. 3 shows another display example of the folder information with the image management program which the present invention is applied to.

It is assumed that multiple image files are divided and recorded into the folders in the external recording device 22 such as a CD-R. By inserting this external recording device 22 into a media insertion slot of the personal computer to, the list of the folder information is displayed as shown in FIG. 3. In FIG. 3, the folders recorded in the external recording device 22 are displayed in a tree structure, and for each folder, a folder icon 40, a representative image 42, a folder name 44, a number of the images 46 and a date range 48 of the images in the folder are displayed. As the representative image 42, for example, a top image (the oldest image) in the folder is selected.

The folder icon 40 attached with identification characters of "PHOTO" in the icon means that it is the folder including the image files. By clicking that folder icon 40, the display is transited to a list-display screen for the images included in that folder.

In FIG. 3, attribute (property) information concerning the whole medium is also displayed, such as a title name 50 of the above described external recording device 22, a date range 52 from the oldest recorded image to the newest recorded image, a used capacity 54 and a creation date 56, as well as a total number of the recorded images 58.

As shown in FIG. 3, since the number of the images 46 and the date range 48 in each folder are displayed in the folder list-display screen, the user can easily infer the images in the folder and easily retrieve the desired image.

Next, another embodiment of the present invention will be described below.

Figure 4:
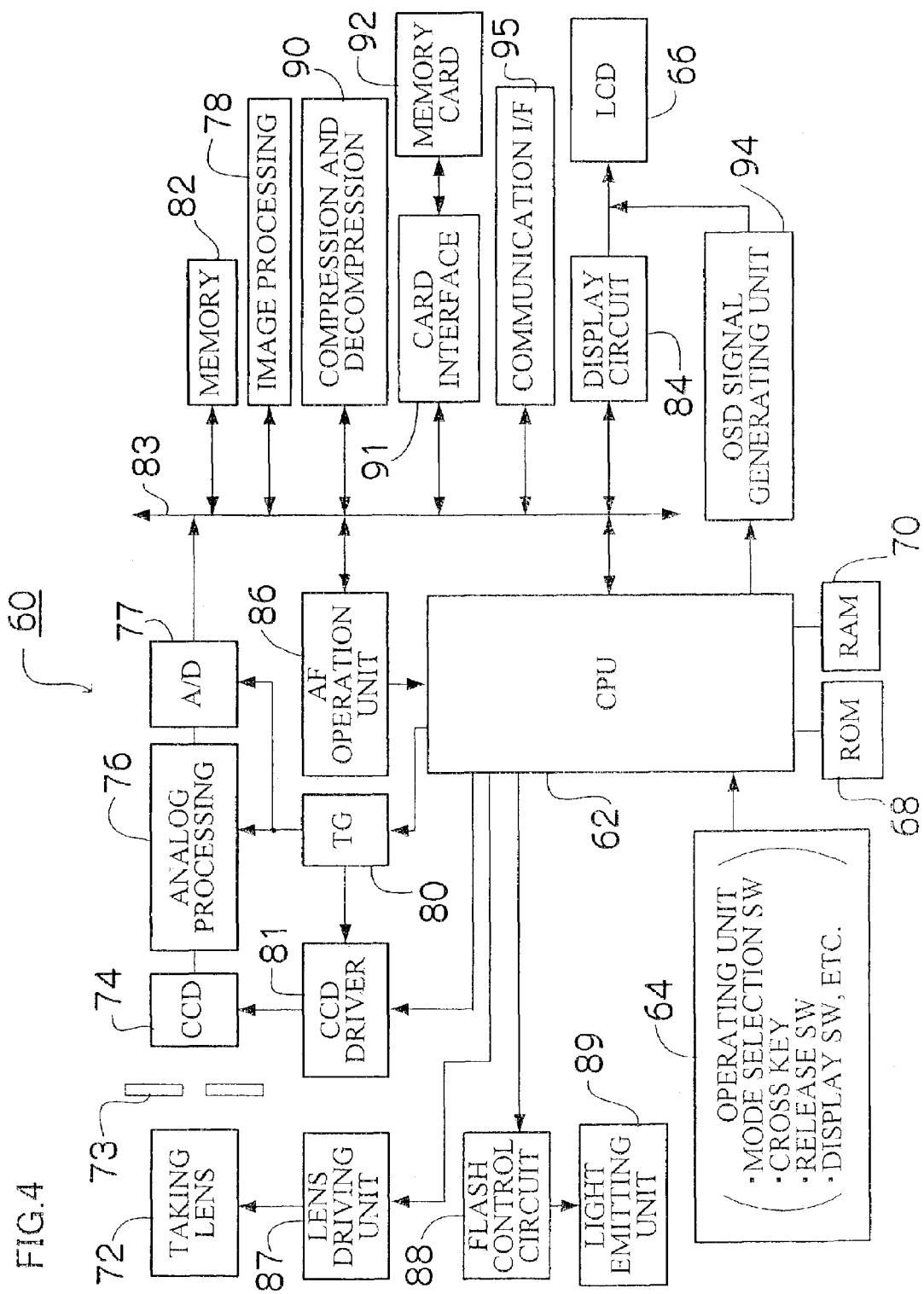

FIG. 4 shows a block diagram of an electronic camera 60 which the present invention is applied to. In FIG. 4, a CPU 62 is a control unit for supervisory-controlling this camera system according to a predetermined program, and controls the operation of each circuit in the electronic camera 60 according to an instruction signal sent from an operating unit 64. The operating unit 64 includes various kinds of operating devices such as a mode selection switch for selecting an operating mode of the electronic camera 60, a cross key for inputting instructions for selecting operation for menu items (cursor moving operation), frame advance/reverse of a played-back image or the like, an execution key for instructing to confirm (register) the selected item or to execute the operation, a key switch such as a cancel key for deleting a desired subject such as the selected item or canceling the instruction, a power supply switch, a zoom switch, a release switch and a display switch for switching on/off or a display mode of a liquid crystal display (LCD) monitor 66.

The CPU 62 is provided with a ROM (Read Only Memory) 68 and a RAM (Random Access Memory) 70. In the ROM 68, various kinds of data is stored which is required for a program and control executed by the CPU 62, and RAM 70 is used as a working area during the execution of various kinds of operation processes and the like by the CPU 62.

A taking function of the electronic camera 60 will be described below. An optical image of an object formed on a photo receiving surface of a CCD solid-state imaging component (hereinafter referred to as CCD) 74 through a taking lens 72 and an aperture 73 is photoelectric-converted by each photo sensor of the CCD 74 to be outputted as an image signal. The signal outputted from the CCD 74 is sent to an analog processing unit 76 where necessary processing is applied to the signal such as Correlation Double Sampling (CDS) process, color separation and gain adjustment, and then the signal is converted to a digital signal by an A/D converter 77 to be sent to an image processing unit 78. A timing generator (TG) 80 follows an instruction from the CPU 62 to provide a timing signal for driving synchronously with respect to the analog processing unit 76 and the A/D converter 77 such that this timing signal keeps synchronization of each circuit.

The image processing unit 78 is a signal processing device including a brightness and color difference signal generation circuit, a gamma correction circuit, a contour correction circuit, a white balance correction circuit and the like, and processes the image signal according to commands from the CPU 62. Image data inputted into the image processing unit 78 is converted into a brightness signal (Y signal) and a color difference signal (Cr, Cb signals) and also undergoes predetermined processing such as gamma correction, then stored in a memory 82.

When a shot image is outputted to the monitor, the image data is read from the memory 82 and sent to a display circuit 84 through a bus 83. The display circuit 84 converts the inputted image data into a signal of a predetermined system for displaying (for example, a color complex video signal of NTSC system) to output it to the LCD monitor 66.

The image data in the memory 82 is periodically rewritten with the image signal outputted from the CCD 74, and a video signal generated from that image data is supplied to the LCD monitor 66, thereby a video being imaged is displayed in real time. The user (photographer) can check a taking field angle with the real time video (live image) displayed on the LCD monitor 66.

The release switch on the operating unit 64 is configured with a two-stage switch having a switch S1 which turns ON when the release switch is half pressed and a switch S2 which turns ON when the release switch is completely pressed. When the CPU 62 senses that the release switch is half pressed (S1=ON), it executes automatic exposure (AE) control and automatic focus adjustment (AF) control. When the CPU 62 senses that the release switch is completely pressed (S2=ON), it starts CCD exposure and read-out control for capturing an image for recording.

An automatic operation unit 86 is a device which executes necessary operations for the AE and AF controls, executes a focus evaluation value operation, an AE operation or the like according to the image signal captured in response to the release switch being half pressed (S1=ON), and communicates a result of the operation to the CPU 62.

When the CPU 62 senses that the release switch is completely pressed (S2=ON), it controls a lens driving unit 87 according to the result of the focus evaluation value operation to move the taking lens 72 to a focus position, and also controls the aperture 73 and an electronic shutter of the CCD 74 (charge storage time) to execute exposure control. The CPU 62 sends the commands to a flash control circuit 88 if necessary to control light emission of a light emitting unit 89.

After the image data captured as described above goes through YC process and other predetermined signal processing in the image processing unit 78, the image data is compressed in a compression and decompression unit 90 according to a predetermined compression format (for example, JPEG system). The compressed image data is recorded in a memory card 92 through a card interface unit 91. The recording system is not limited to JPEG, and any other recording system such as MPEG and the like may also be used. The device which stores the image data is not limited to a semiconductor memory such as the memory card 92, but also various kinds of media may be used such as a magnetic disk, an optical disk and a magneto-optic disk. The medium is not limited to a removable one, but it may be a recording medium (internal memory) built in the electronic camera 60.

The electronic camera 60 of this example is provided with a function of dividing and recording the shot images into the folders so that the user can properly select the folder for storage and store the image files therein.

When a playback mode is selected with the mode selection switch of the operating unit 64, the image file recorded in the memory card 92 is read out, decompressed in the compression and decompression unit 90, and then outputted to the LCD monitor 66 via the display circuit 84. While one frame is played-back, the file to be played-back may be switched (frame advance/reverse) by operating a right key or a left key of the cross key.

On the LCD monitor 66, not only the above described live image or the played-back image of the recorded image is displayed, but also information concerning the mode currently set, information concerning a compression rate of the image, date and time information, a frame number, information indicating a storage location for the image file and the like are displayed. The LCD monitor 66 is also used as a screen for displaying a user interface during various kinds of setting operations and the like by the user, and menu information such as setting items is also displayed thereon as necessary.

An OSD signal generating unit 94 includes a character generator, which is capable of generating a signal for displaying character and symbol information and the like such as the shot date and time, a title and a warning message. The signal outputted from the OSD signal generating unit 94 is mixed into the image signal as necessary and supplied to the LCD monitor 66.

The electronic camera 60 has a data communication interface unit 95 as a device which sends and receives the data to and from the external apparatus not shown such as the personal computer and the like. The communication mode is not particularly limited, and for example, USB, IEEE 1394, Bluetooth and the like may be applied thereto.

Figure 5:
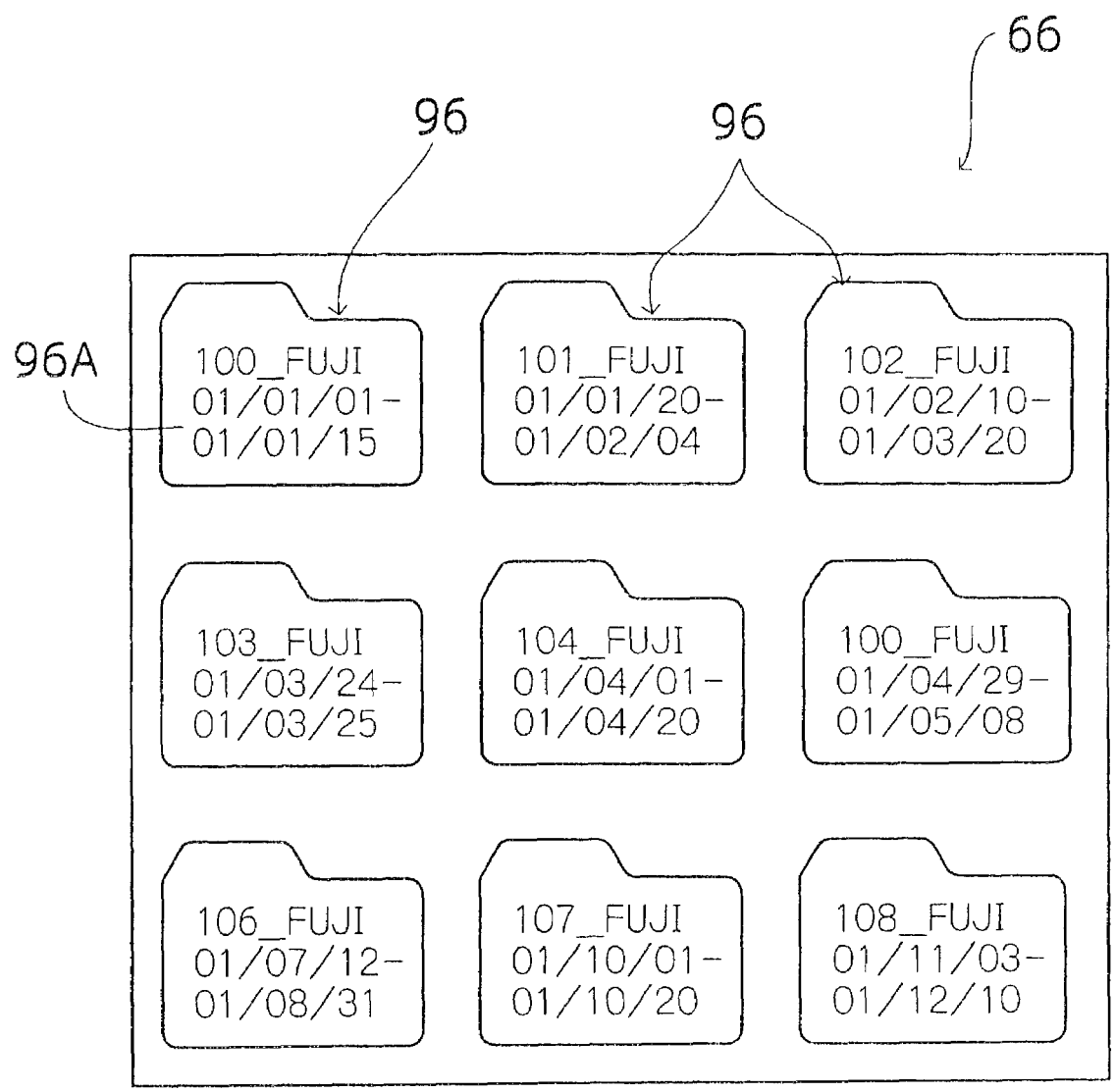
FIG. 5 shows a display example of a folder display mode in the electronic camera.

Next, display examples of the folder information in the electronic camera 60 configured as described above will be described below. FIG. 5 shows a first display example in a folder display mode. The electronic camera 60 of this example has "file display mode" for playing-back and displaying the image files in the memory card 92 in the playback mode and "folder display mode" for displaying the folder information in the memory card 92 such that the user can selectively switch the display mode in the playback mode between "file display" and "folder display".

When the electronic camera 60 is set to the playback mode and the display mode is set to "folder display", a list screen of the folder information is displayed as shown in FIG. 5. In FIG. 5, icons (folder icons) 96 corresponding to the folders recorded in the memory card 92 are displayed, and also on each folder icon 96, a folder name (such as "100_FUJI") as well as a date range of the images included in the folder are displayed.

Figure 6:
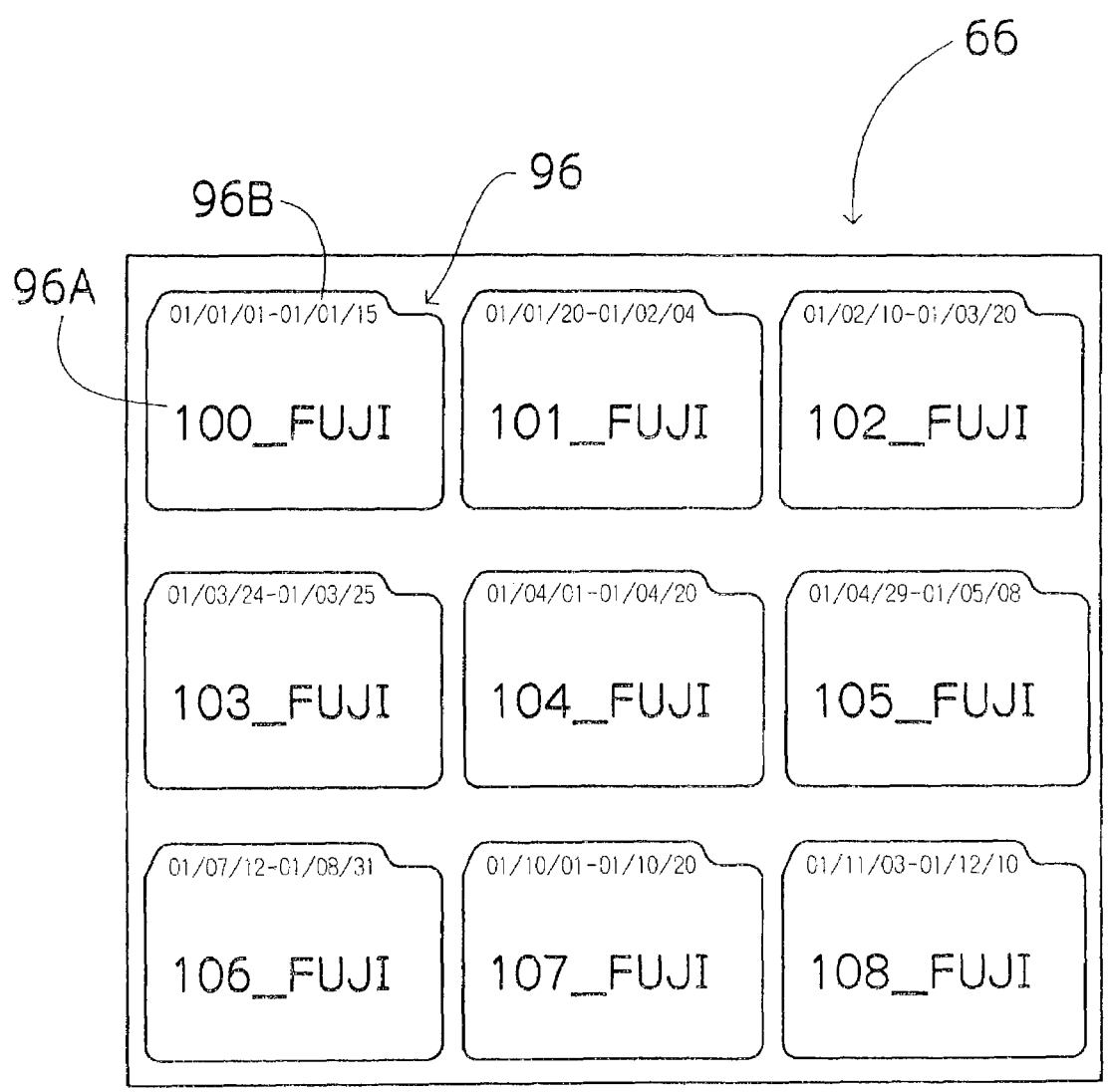
FIG. 6 shows another display example of the folder display mode in the electronic camera.

As shown in FIG. 5, since an aspect, in which the folder name and the date range are shown together in a main section (middle section) 96A on the folder icon 96, may give the user such an impression that information concerning the folder name and the date range is burdensome, it is preferred to change sizes or colors of characters between the display of the folder name and the display of the date range in order to make the whole display easy to visually understand. As shown in FIG. 6, another aspect is also preferred in which the folder name is displayed in the main section (middle section) 96A on the folder icon 96 and the date range is displayed in a tab portion 96B on the folder icon 96.

As shown in FIGS. 5 and 6, since the folder name and the date range are combined and displayed on the folder icon 96, the user can infer the images in the folder to some extent and use that as a guideline for image selection. When the user selects a desired folder, the display is transited to the display mode for playing-back and displaying the image files included in the desired folder.

As shown in FIG. 5 or 6, not only a display form for displaying the information concerning the folder name and the date range, but also another aspect for displaying the representative image for each folder as explained with respect to FIG. 3 is considered to be preferable. However, since the LCD monitor 66 mounted on the electronic camera 60 is relatively smaller than the display 30 of the personal computer 10, even if the representative image of each folder is displayed in a list-display of the folders, the image may be too small to visually understand.

Figure 7:
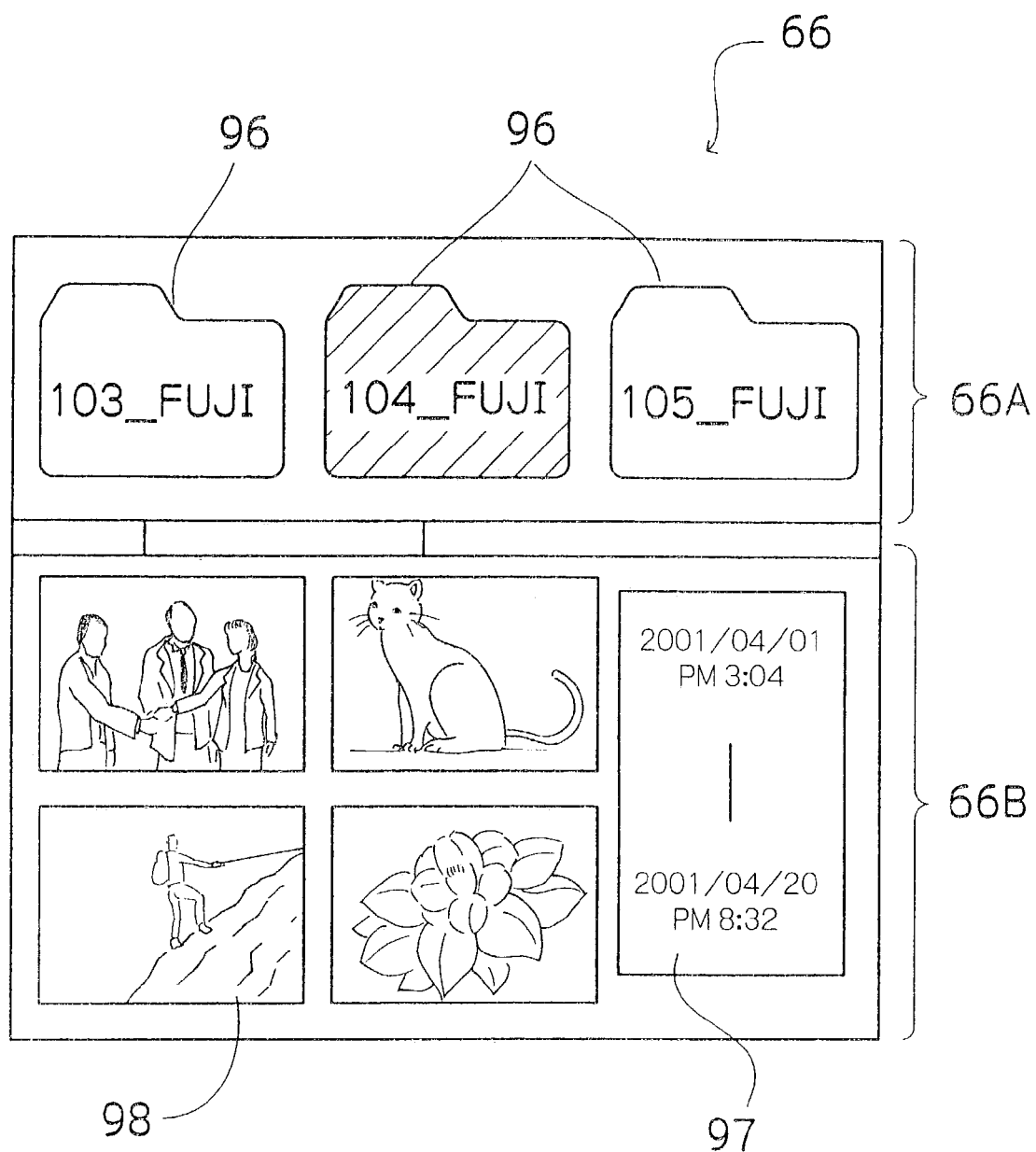
FIG. 7 shows a display example of an enlarged screen display mode in the electronic camera.

Therefore, there is an aspect in which an enlarged screen display mode is added as shown in FIG. 7. The display mode of the electronic camera 60 is controlled such that the display may be transited from the folder list-display screen as explained with respect to FIG. 5 or 6 to the display form of the enlarged screen display mode as shown in FIG. 7.

When the display is switched to the enlarged screen display mode, a plurality of folder icons 96 (three icons in this example) are displayed on an upper area 66A in the screen as shown in FIG. 7, and for one selected folder (the folder of "104_FUJI" in FIG. 7) among them, date range information 97 is displayed at the right in a middle lower area 66B in the screen and four frames of representative images 98 extracted from the above described folder are displayed at the left therein. The representative images 98 may be extracted from the folder in order of earlier dates and times, or they may be extracted at a predetermined interval of the number of the images or by calculating an equal division of the number of the images.

It should be noted that though the four representative images 98 are displayed in FIG. 7, the number of the representative images 98 is not particularly limited, and no representative images may be displayed or only a single image may be displayed.

Next, the playback operation of the electronic camera 60 according to this embodiment will be described below.

Figure 8:
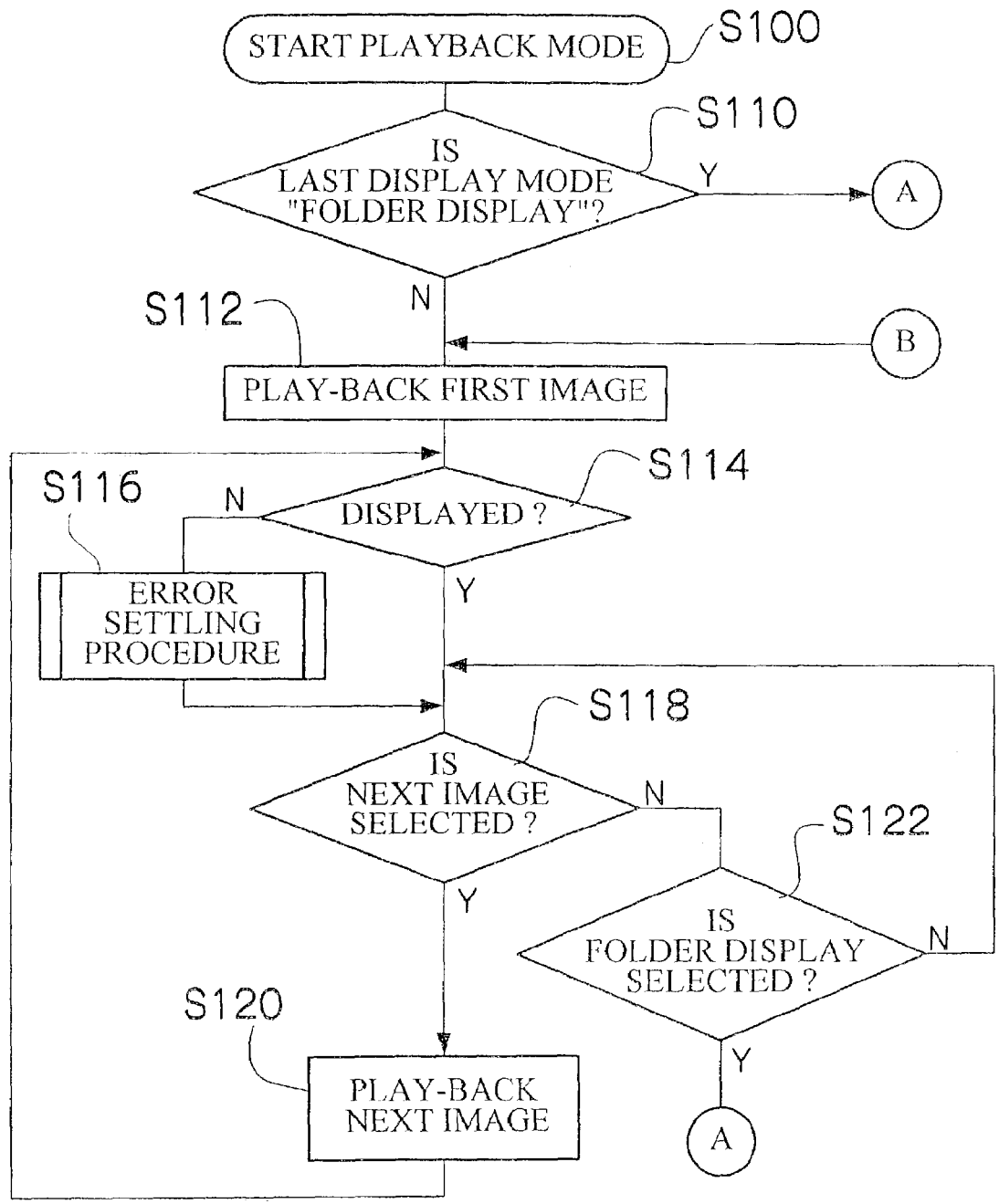
FIG. 8 shows a flowchart showing a control procedure for a playback mode in the electronic camera.
Figure 9:
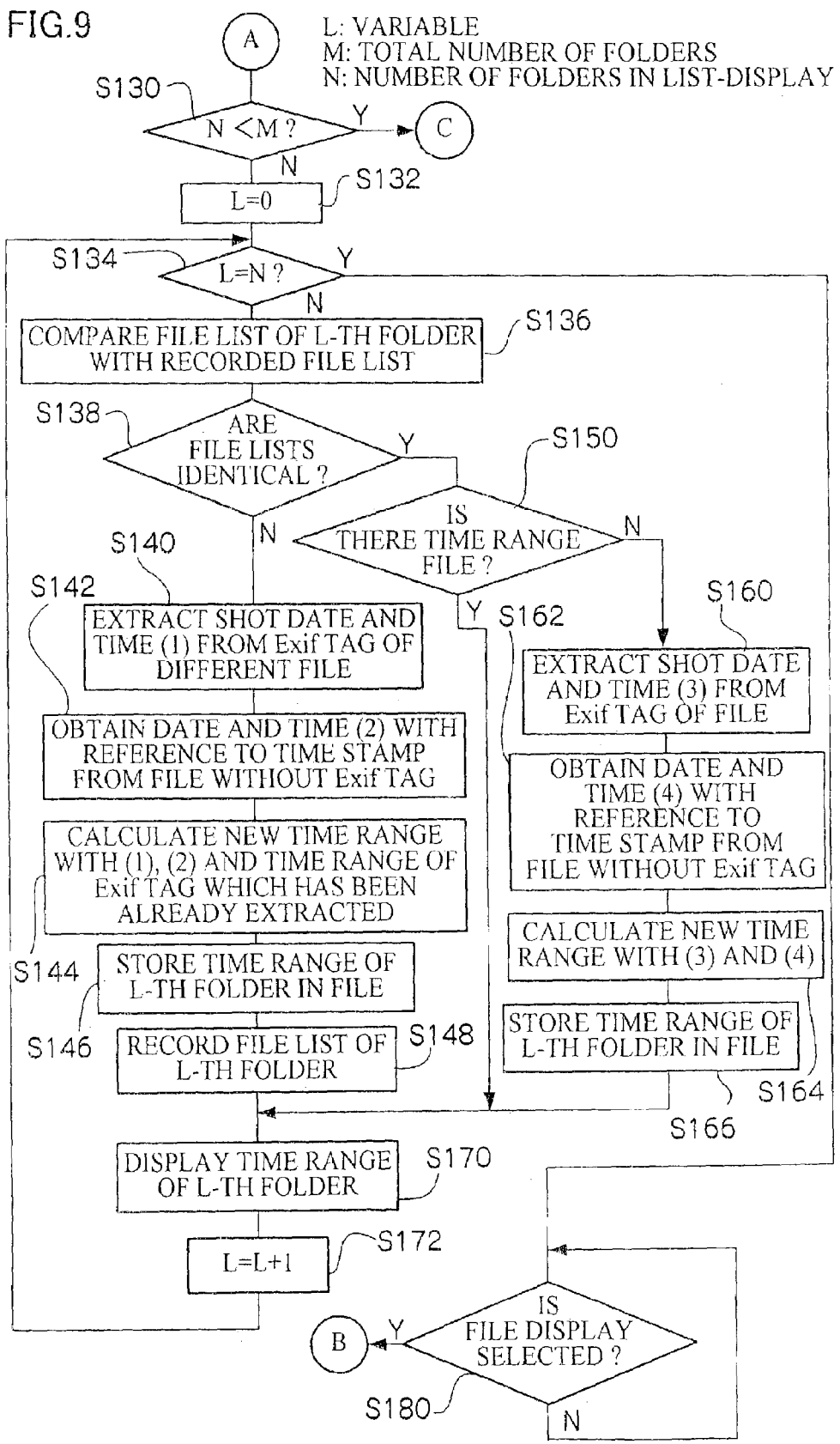
FIG. 9 shows a flowchart showing the control procedure for the playback mode in the electronic camera.
Figure 10:
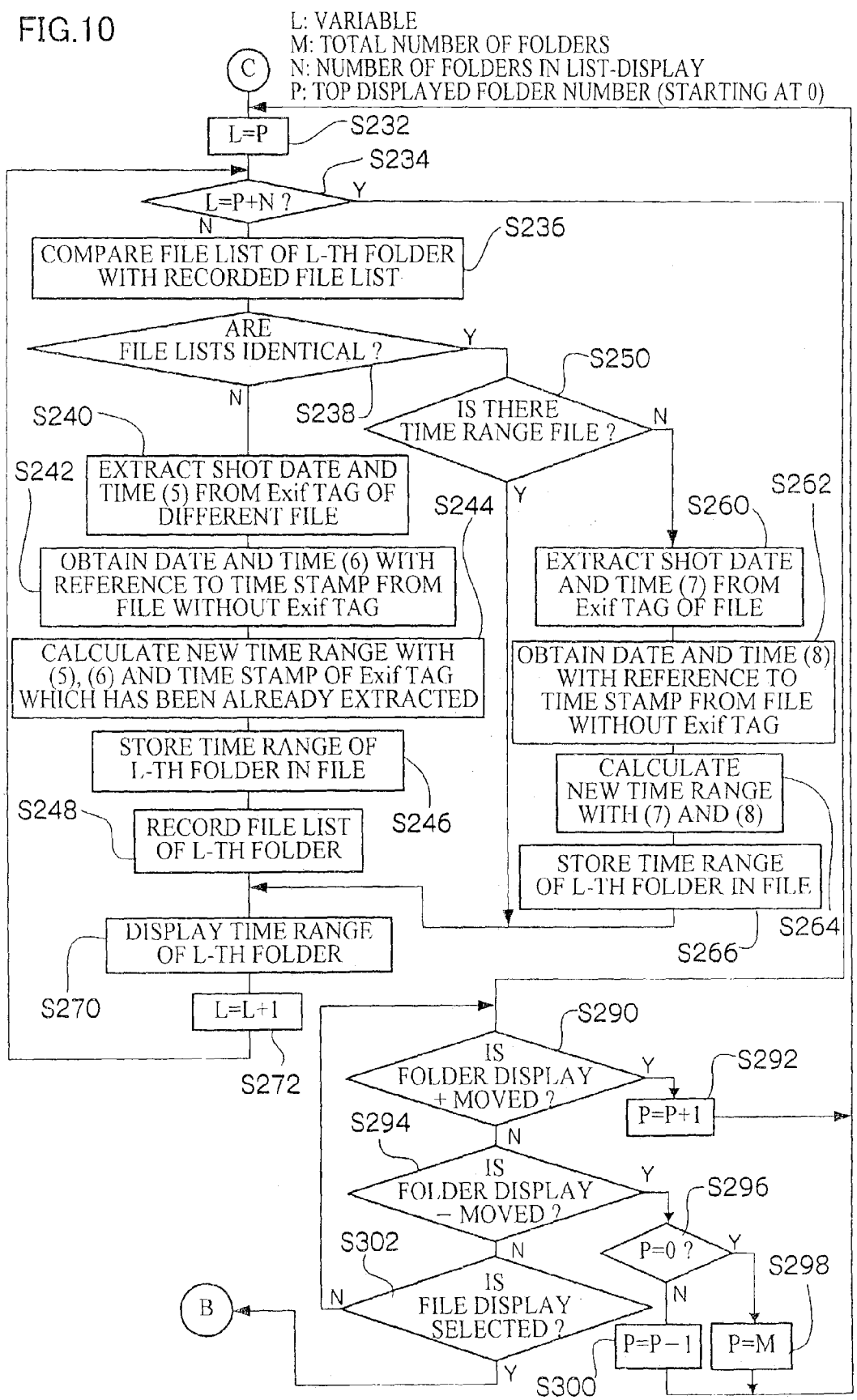
FIG. 10 shows a flowchart showing the control procedure for the playback mode in the electronic camera.

FIGS. 8 to 10 show flowcharts showing a control procedure for the playback mode in the electronic camera 60. As shown in FIG. 8, when the playback mode is started (step S100), the CPU 62 determines whether the last display mode is "folder display mode" or not (step S110). Information concerning the display mode set last time has been stored in the electronic camera 60, and when the playback mode is started, the display is executed in the display mode according to the last setting.

If the last display mode is "file display" mode (NO in step S110), the procedure proceeds to step S112, where a process of playing-back the first image is executed. It should be noted that "first image" to be played-back is, for example, an image recorded last in the memory card 92 (the newest image), or an image which was being played-back when the last playback mode was ended (the last displayed image).

Next, it is determined whether the image is displayed normally or not (step S114). If the image to be displayed is not displayed, an error settling procedure is executed (step S116) and an error message or the like is displayed. After step S116, or if the image is displayed properly in step S114 (YES in step S114), the procedure proceeds to step S118. In step S118, it is determined whether the next image to be played-back is selected or not. If the user operates to execute the frame advance or reverse, the next image is played-back depending on the operation (step S120).

After step S120, the procedure returns to step S114 and repeats the above-described process. If it is determined as NO in step S118, the procedure proceeds to step S122, where it is determined whether "folder display" mode is selected or not. If "folder display" mode is not selected, the procedure returns to step S118. On the other hand, if "folder display" mode is selected, the procedure proceeds to step S130 in FIG. 9. In step S110 in FIG. 8, if the last display mode is "folder display" mode, the procedure also proceeds to step S130 in FIG. 9.

In step S130 in FIG. 9, the number N of folders which may be displayed at once on the screen of the LCD monitor 66 (hereinafter referred to as "the number of folders in list-display"), and the total number M of the folders in the memory card 92 (the total number of folders in which the images are included) are compared with each other. If the total number of folders M is equal to or lower than the number of folders in list-display N (NO in step S130), information concerning all of the folders may be displayed on a single screen. In this case, the procedure proceeds to step S132, where the CPU 62 sets a variable L to an initial value of "0".

Next, it is determined whether the value of the variable L equals to the number of folders in list-display N or not (step S134). If it is determined as NO in step S134, the procedure proceeds to step S136, where a file list of the L-th folder (a current file list) and a recorded file list are compared with each other to determine whether the current file list and the file list recorded on the last display are identical (step S138).

After the folder information was displayed last time, any addition or deletion of the image makes a difference between the recorded file list and the current file list. If it is determined that those file lists are different from each other in step S138 (NO in step S138), the procedure proceeds to step S140 to newly calculate the time range.

In step S140, data on the shot date and time is extracted from an Exif tag of a different file in the file lists. For the file without the Exif tag, the date and time data is obtained with reference to the time stamp of the file (step S142). Then, a new time range is calculated with the date and time data obtained in steps S140 and S142 and the time range of the Exif tag which has been already extracted in the last display (step S144), and the obtained time range is stored in a file as time range information concerning the L-th folder (step S146). Furthermore, the above described file list of the L-th folder is also recorded (step S148).

On the other hand, if it is determined that the file lists are identical in step S138, the procedure proceeds to step S150, where it is determined whether there is a time range file or not. The time range file is a file for recording the time range information concerning the images included in the folder, in which, for the images whose time range has been already calculated a result of the calculation has been recorded as the file.

If there is no time range file in step S150 (NO in step S150), the data on the shot date and time is extracted from the Exif tag of each image file in the folder (step S160). For the file without the Exif tag, the date and time data is obtained with reference to the time stamp of the file (step S162). Then, a new time range is calculated according to the date and time data obtained in steps S160 and S162 (step S164), and the obtained time range is recorded in a file as the time range information concerning the L-th folder (step S166).

If there is the time range file in step S150 (YES in step S150), the process of steps S160 to S166 is omitted since the time range information recorded in that time range file may be used as it is.

After the time range concerning the L-th folder is determined through the above-described step S146 or S166, or after it is determined as YES in step S150, the procedure proceeds to step S170, where the time range of the L-th folder is displayed. Then, the CPU 62 increments the value of the variable L (step S172), and the procedure returns to step S134.

The procedure repeats the above-described process for each folder, incrementing the value of the variable L by 1, to realize the display of the time range of the folder. When the time range display is completed for all of the folders which may be list-displayed, and the variable L reaches the number of folders in list-display N, it is determined as YES in step S134, and the procedure proceeds to step S180.

In step S180, it is determined whether the user selects "file display" mode or not. If an instruction for switching to "file display" mode is not inputted (NO in step S180), the current "folder display" mode is maintained and the list screen of the folders including the time range display remains to be displayed.

On the other hand, if the user selects "file display" mode in step S180, the procedure proceeds to step S112 in FIG. 8, where the process of playing-back the image file is executed.

In step S130 shown in FIG. 9, if the total number of folders M is larger than the number of folders in list-display N (YES in step S130), all of the folders cannot be displayed on the single screen of the LCD monitor 66, therefore the procedure proceeds to step S232 in FIG. 10.

In step S232, the CPU 62 sets the variable L to a top displayed folder number P. The top displayed folder number P is a variable meaning a number of the folder to be displayed on top on the display screen of the LCD monitor 66. In the example described in FIG. 5, "100_FUJI" on the left upper corner on the screen corresponds to the top displayed folder. The top displayed folder number P starts at "0" in this example.

After the CPU 62 sets the variable L to the value of "P" in step S232 in FIG. 10, it determines whether the value of the variable L equals to "P+N" or not (step S234). If it is determined as NO in step S234, the procedure proceeds to step S236. Contents of the process of steps S236 to S272 are similar to those of steps S136 to S172 as explained with respect to FIG. 9, therefore the explanation thereof is omitted. It should be noted that, in FIG. 10, process steps corresponding to those in FIG. 9 are assigned with step numbers of those in FIG. 9 plus "100" respectively.

The process of steps S234 to S272 in FIG. 10 is repeated. When the time range display is completed for each of the N folders which may be list-displayed on the screen of the LCD monitor 66, it is determined as YES in step S234, and the procedure proceeds to step S290.

In step S290, it is determined whether the user instructs to move the folder display in + direction (page advance in the folder display) or not. If the instruction for the + direction movement is inputted (YES in step S290), the CPU 62 increments the variable P (step S292) and the procedure returns to step S232. Thereby, a page in the folder display screen is forwardly changed.

If it is determined as NO in step S290, the procedure proceeds to step S294, where it is determined whether the user instructs to move the folder display in − direction (page reverse in the folder display) or not. If the instruction for the − direction movement is inputted (YES in step S294), the CPU 62 determines whether the current top displayed folder number P is "0" or not (step S296). If "P=0", the CPU 62 sets the value of the variable P to "M" (step S298) and the procedure returns to step S232.

On the other hand, if "P≠0" in step S296, the CPU 62 decrements the value of the variable P (step S300) and the procedure returns to step S232. In other words, if the page reverse in the − direction is instructed while the top page on the folder display screen is displayed, the display is transited to a page including the folder of the last folder number (last page). If the page reverse in the − direction is instructed while a page other than the top page is displayed, the display is switched to one page prior to the current page.

If the instruction for the − direction movement is not inputted in step S294, the procedure proceeds to step S302. In step S302, it is determined whether the user selects "file display" mode or not. If an instruction for switching to "file display" mode is not inputted (NO in step S302), the current "folder display" mode is maintained and the list screen of the folders including the time range display remains to be displayed.

On the other hand, if the user selects "file display" mode in step S302, the procedure proceeds to step S112 in FIG. 8, where the process of playing-back the image file is executed.

<Another Control Example>

Figure 11:
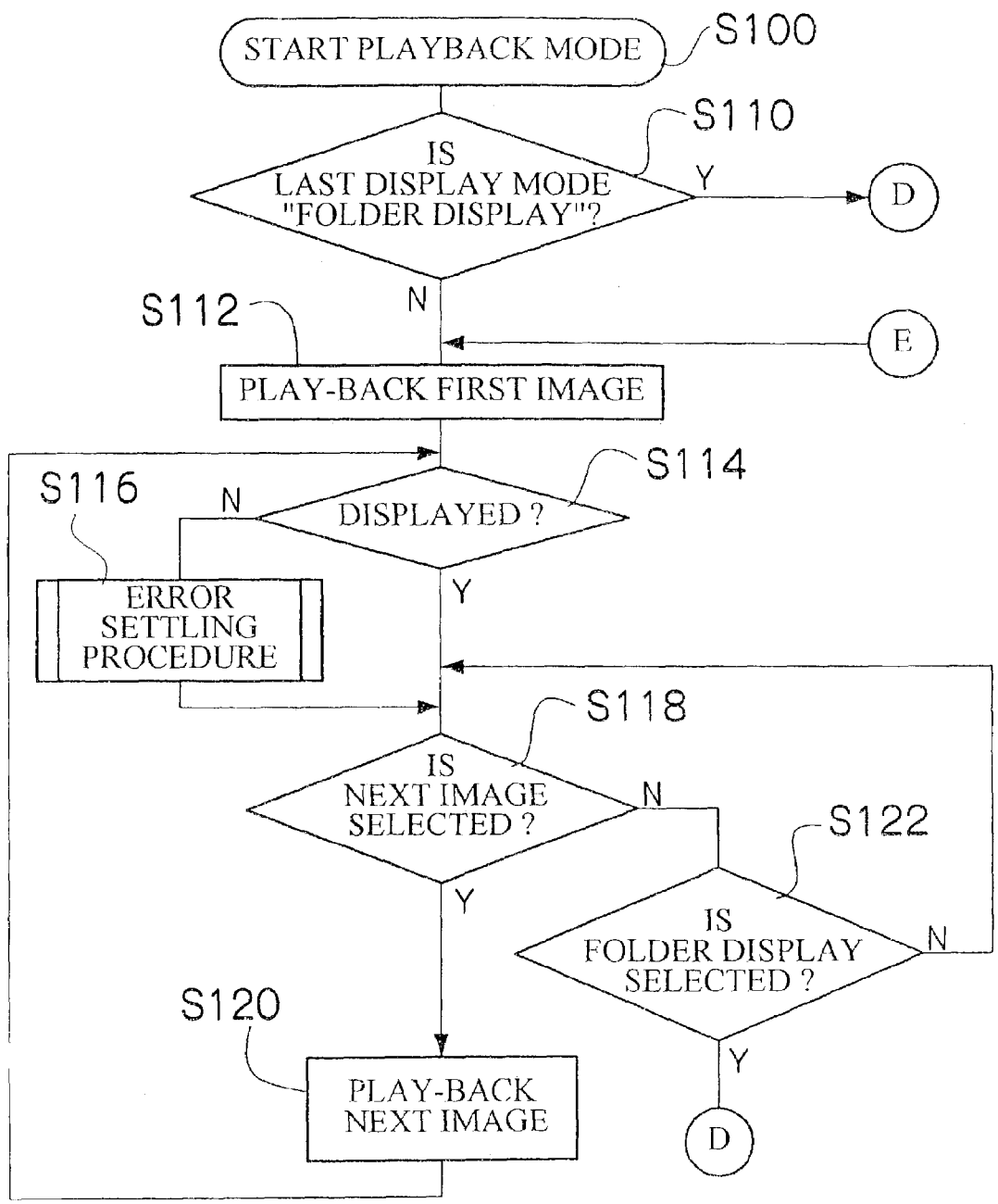
FIG. 11 shows a flowchart showing another control example for the playback mode in the electronic camera.
Figure 12:
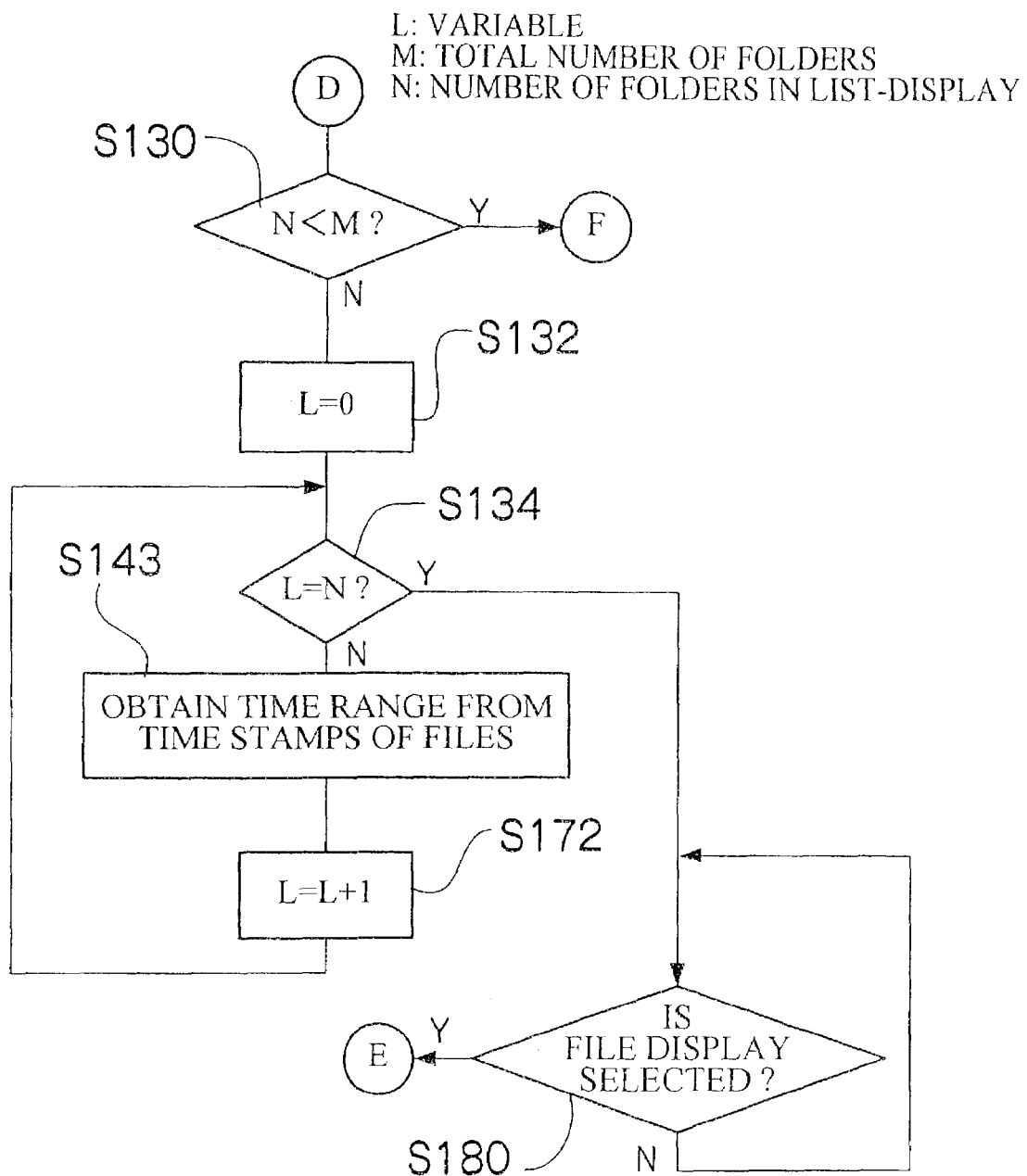
FIG. 12 shows a flowchart showing another control example for the playback mode in the electronic camera.
Figure 13:
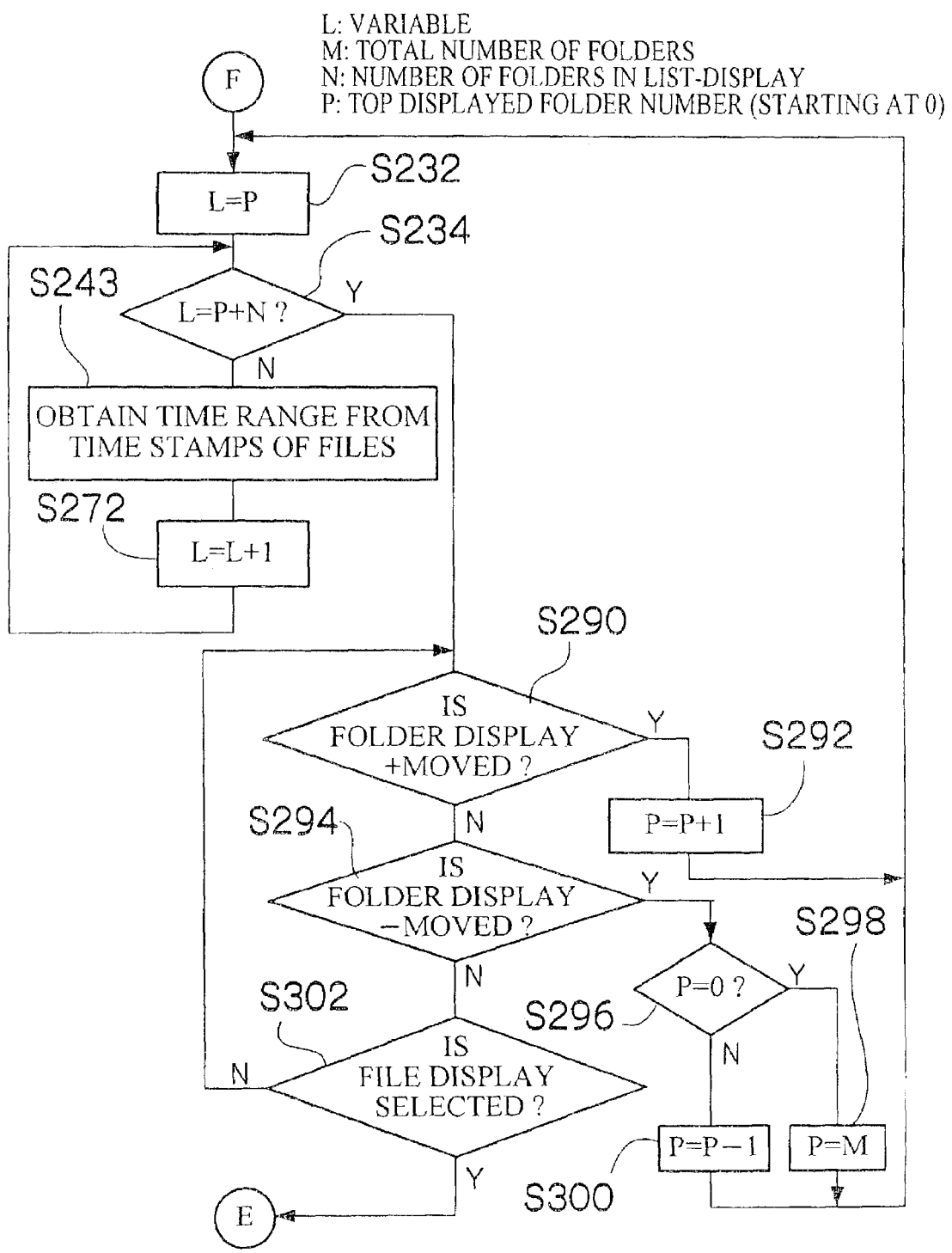
FIG. 13 shows a flowchart showing another control example for the playback mode in the electronic camera.
Figure 14:
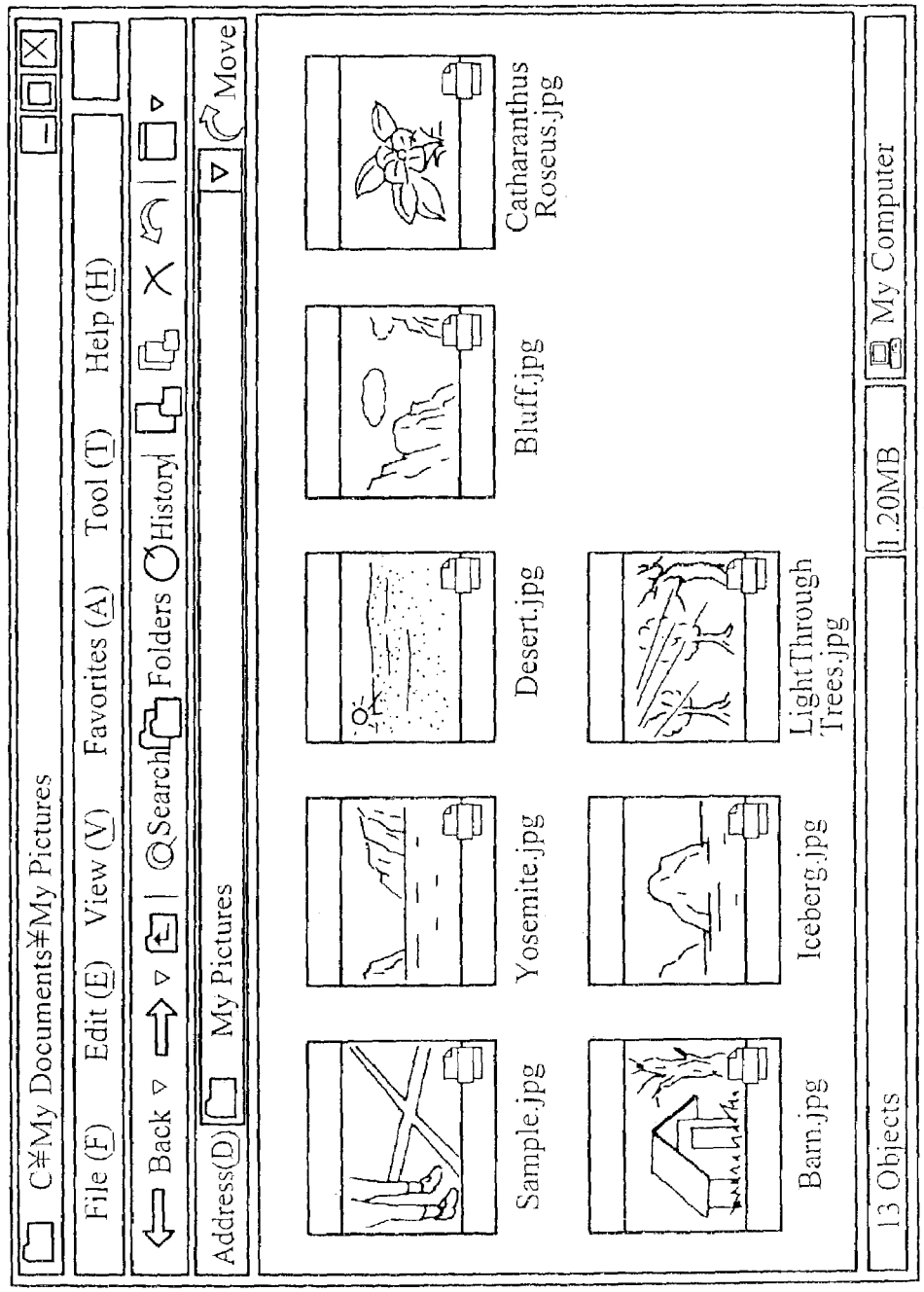
FIG. 14 shows a screen example of list-displaying images on Windows® OS.
Figure 15:
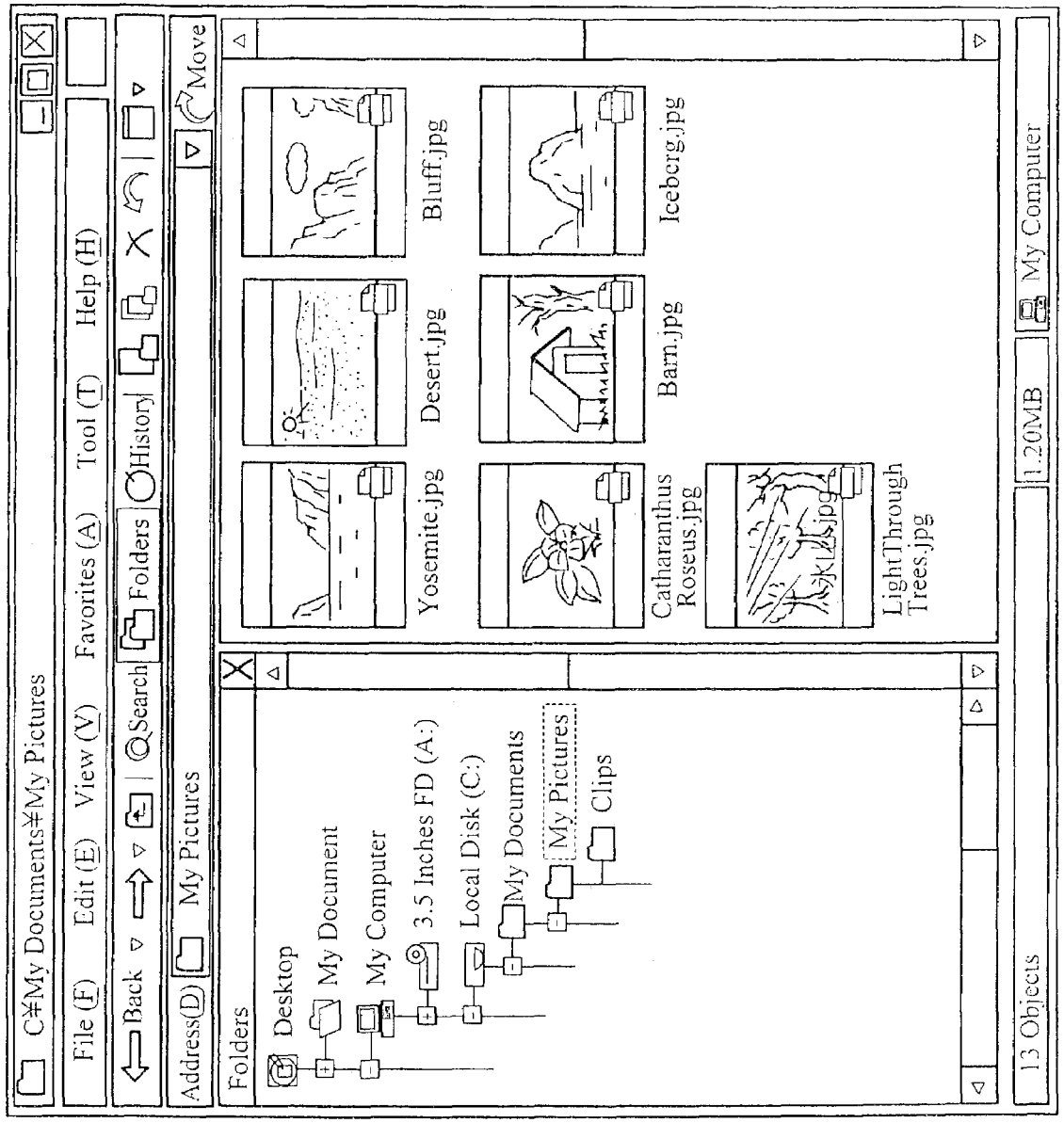
FIG. 15 shows another screen example of list-displaying the images on Windows® OS.
Figure 16:
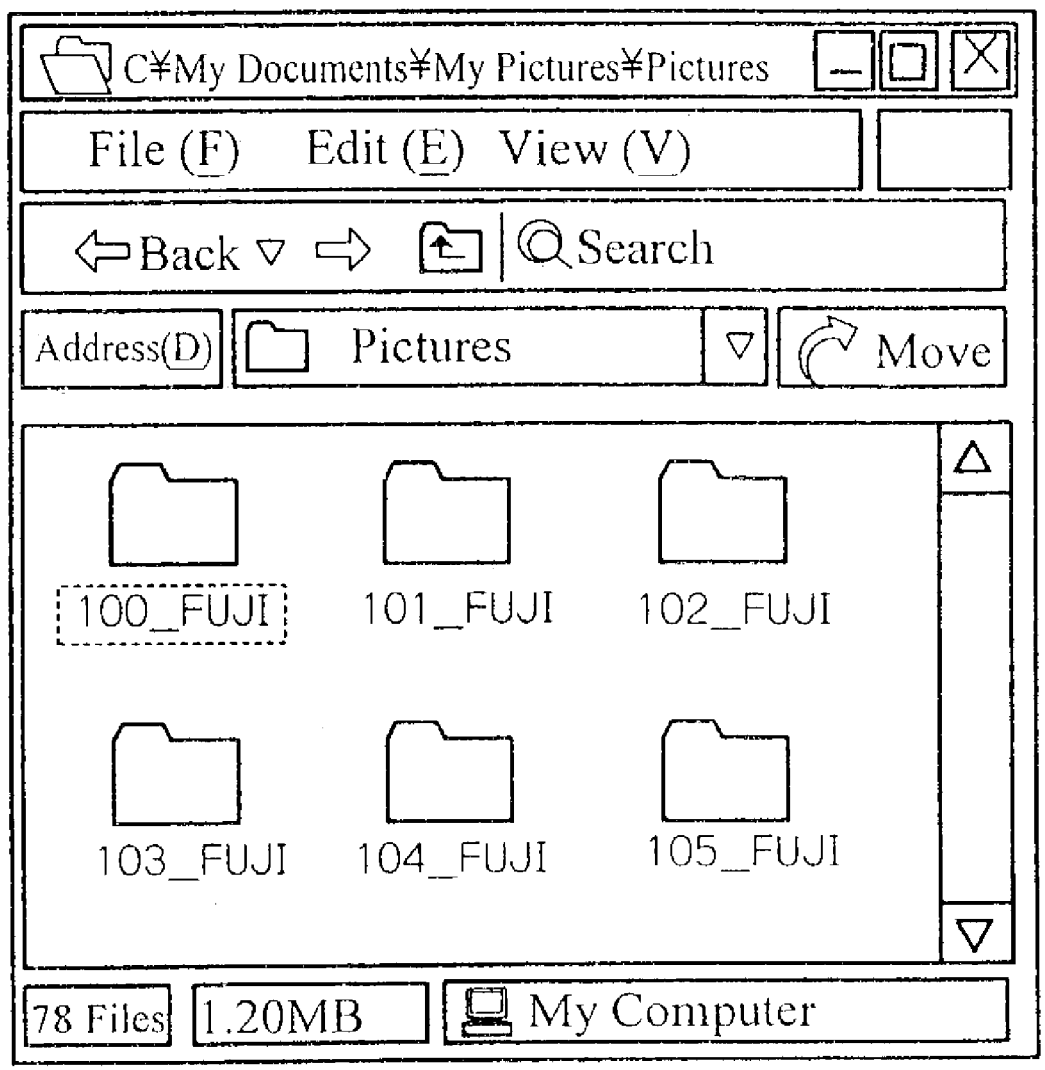
FIG. 16 shows a screen example of list-displaying folders of the images on Windows® OS.
Figure 17:
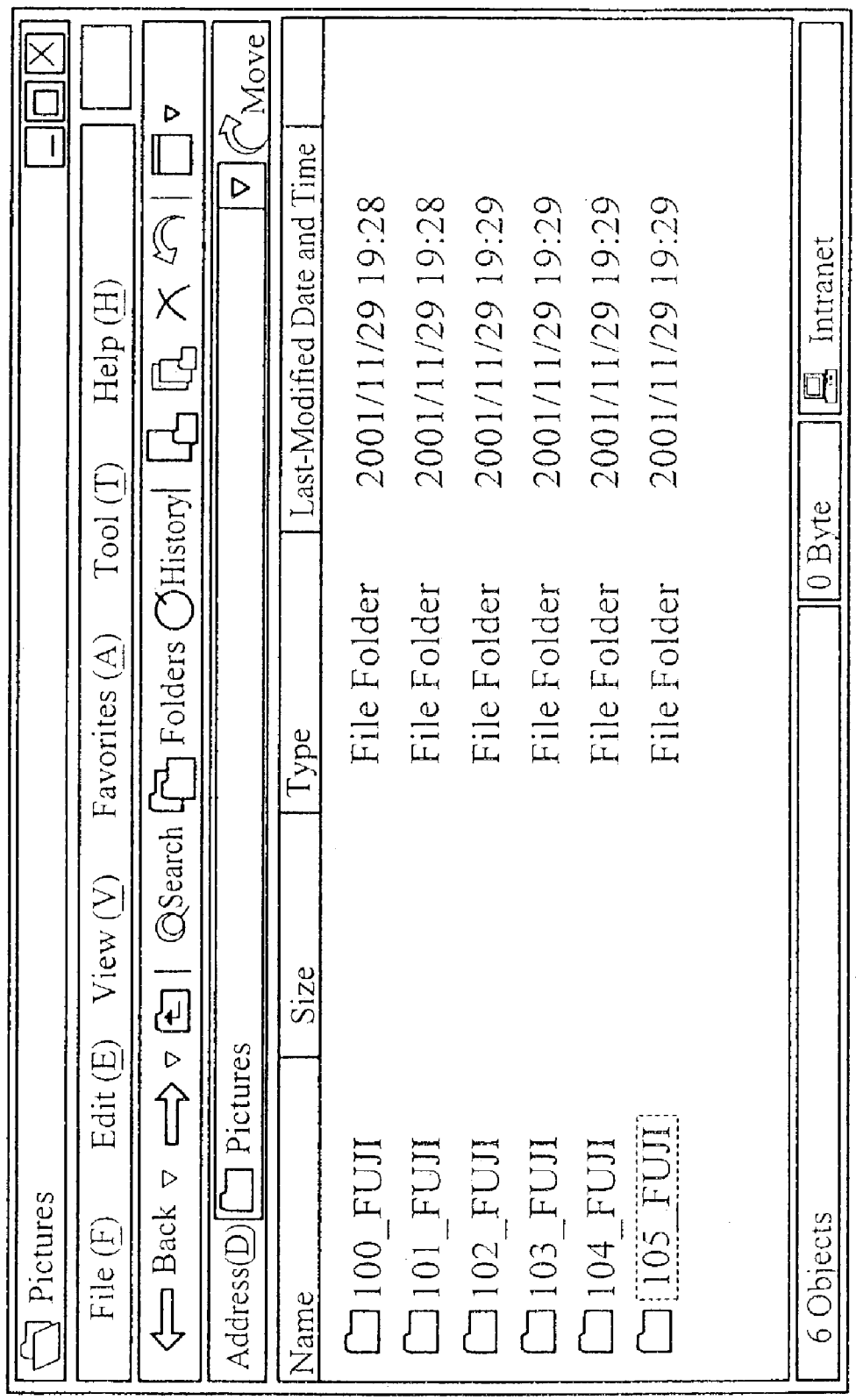
FIG. 17 shows a screen example of displaying details of the folders on Windows® OS.
Figure 18:
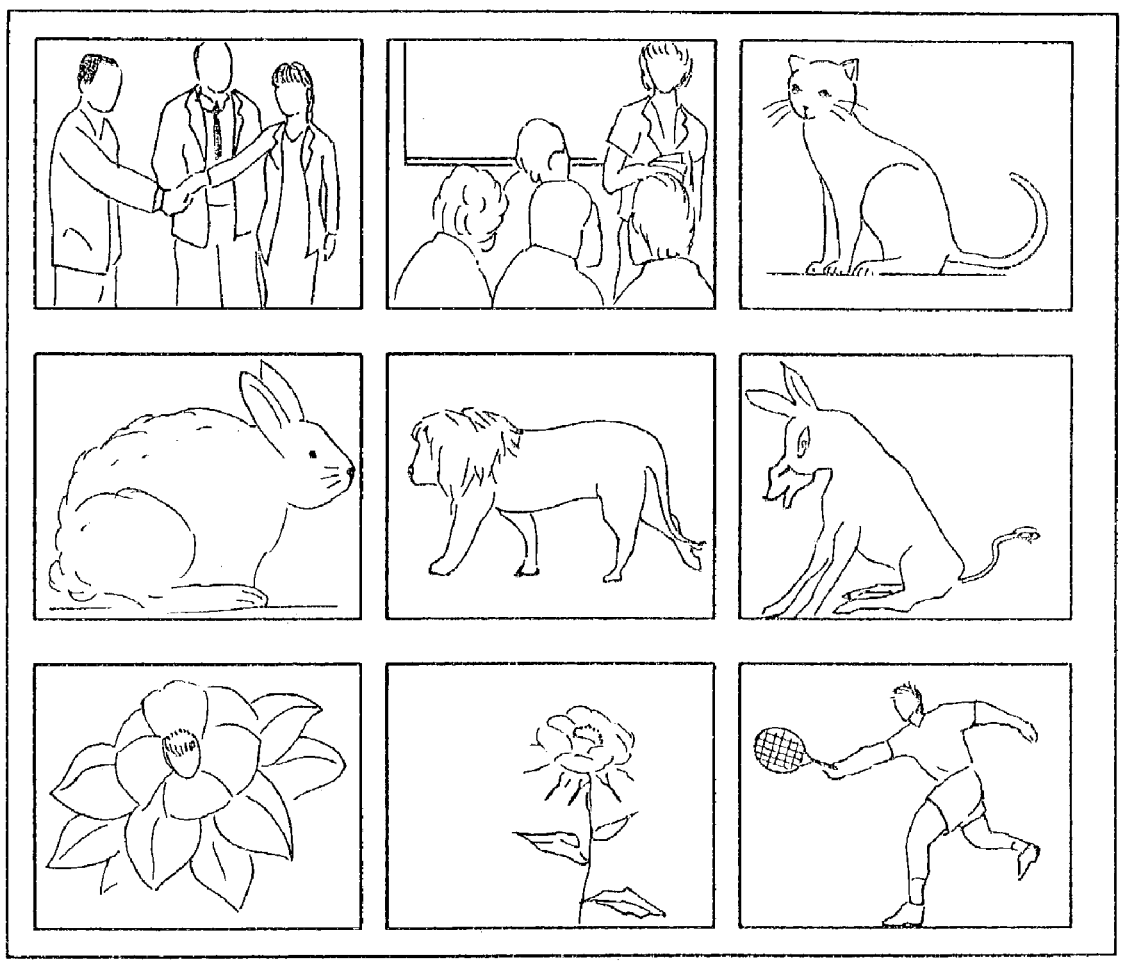
FIG. 18 shows a screen example of list-displaying the images in the conventional digital camera.
Figure 19:
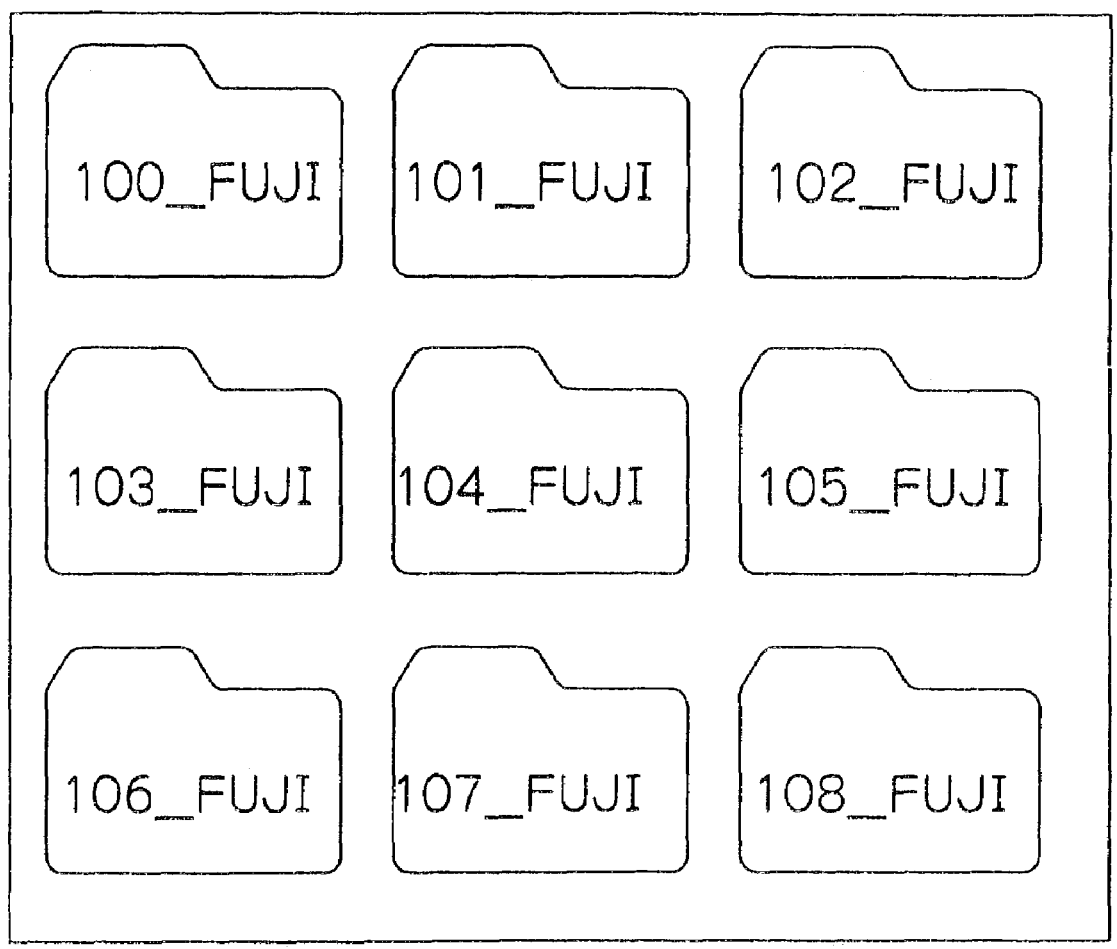
FIG. 19 shows a screen example of list-displaying the folders of the images in the conventional digital camera.
Figure 20:
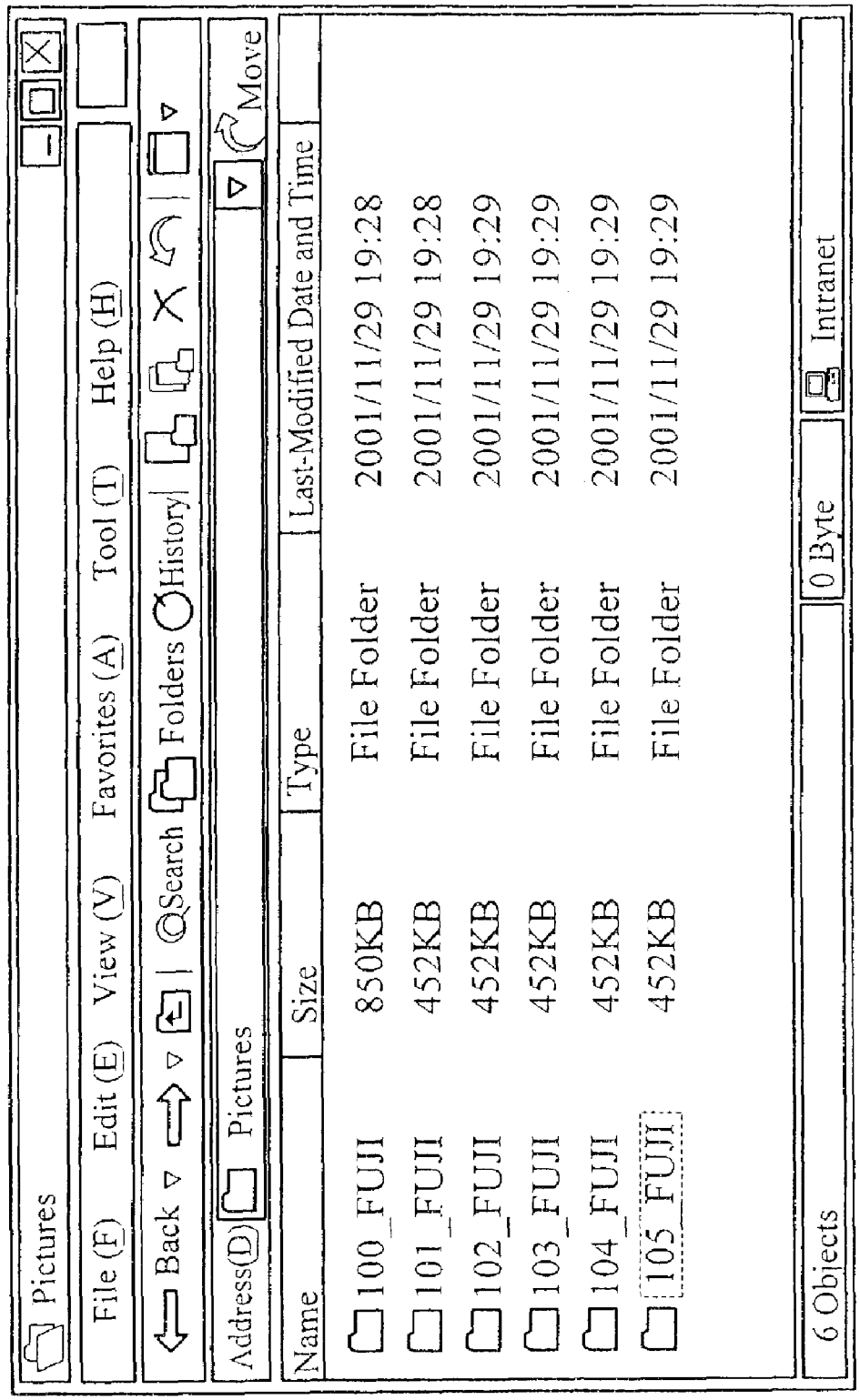
FIG. 20 shows a screen example of the conventional application software for realizing a function of displaying data sizes of the folders.

Though the example of calculating the time range from the Exif tag is described in FIGS. 8 to 10, application of the present invention is not limited to this example. FIGS. 11 to 13 show flowcharts in the case of reading the time stamp of the file to display the time range.

In FIGS. 11 to 13, the process steps that are identical or similar to those in the flowcharts explained in FIGS. 8 to 10 are assigned with identical reference numerals, and the explanation thereof is omitted.

As shown in FIG. 12, after step S134, the procedure proceeds to step S143, where the time range is obtained for the L-th folder from the time stamps of the files in the folder. Then the procedure proceeds to step S172 to increment the variable L, and returns to step S134. As shown in FIG. 13, after step S234, the procedure proceeds to step S243, where the time range is obtained for the L-th folder from the time stamps of the files in the folder. Then the procedure proceeds to step S272 to increment the variable L, and returns to step S234.

As described above, it is also possible to obtain the time range from the time stamps of the files. Though FIGS. 4 to 13 are explained with the electronic camera by way of example, the control examples are not limited to the electronic camera, but also the control examples may be applied to various apparatus having an image display function, such as a PDA (Personal Data Assistance), a mobile phone and the like.

A computer program for realizing the above described function of displaying the time range of the files may be recorded in a CD-ROM, a magnetic disk and other recording media to provide the above described program through the recording media to third parties, or to provide a download service for the above described program through a communication line such as the Internet.

As described above, according to the present invention, the date and time information concerning the image files included in the folder are detected, the time range from the oldest image to the newest image is obtained, and this time range is displayed, so that the user can infer the images included in the folder to some extent only with the folder information and thereby easily retrieve the images.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image display apparatus which displays information concerning folders in which image files are included to receive an instruction for selecting a folder, and displays images included in the selected folder, the image display apparatus comprising:
    a date and time information obtaining device which obtains date and time information concerning the images included in the folder;
    a calculating device which calculates a time range from an oldest image to a newest image in the folder according to the date and time information obtained by the date and time information obtaining device;
    a display control device which displays date and time information indicating the time range calculated by the calculating device; wherein the display control device has a mode for displaying an icon of the folder, the icon comprising a representative image included in the folder and the information indicating the date and time range of the folder, wherein the representative image is extracted at a predetermined interval of the number of images included in the folder;
    a storage device for storing data of the time range and a file list of the images included in the folder for which the time range is calculated; and
    a processor for comparing a current file list with the stored file list, and if the both file lists are identical, displaying the time range in a hour/minute format using the stored data, while if the both file lists are different from each other, obtaining date and time information concerning the images only for a different file and recalculating the time range using at least one of the stored file list and time range.

2. The image display apparatus as defined in claim 1, wherein the date and time information is obtained from tag information recorded with the image files.

3. The image display apparatus as defined in claim 1, wherein the date and time information is obtained from information concerning date and time of image file creation recorded automatically with the image files at creation of the image files.

4. The image display apparatus as defined in claim 1, further comprising a file creating device which creates a file in which at least date and time information is included.

5. The image display apparatus as defined in claim 1, wherein the display control device displays the information indicating the time range in a main section on an icon of the folder.

6. The image display apparatus as defined in claim 1, wherein the display control device displays the information indicating the time range in a tab portion on an icon of the folder.

7. The image display apparatus as defined in claim 1, wherein the display control device displays a representative image for each folder.

8. A method for displaying, on a display, information concerning folders in which image files are included, the method comprising the steps of:
    obtaining date and time information concerning images included in the folder;
    calculating a time range from an oldest image to a newest image in the folder according to the date and time information obtained in the obtaining step; displaying, on the display, date and time information indicating the time range calculated in the calculating step; and
    realizing a mode for displaying an icon of the folder, the icon comprising a representative image included in the folder and the information indicating the date and time range of the folder, wherein the representative image is extracted at a predetermined interval of the number of images included in the folder;
    storing data of the time range and a file list of the images included in the folder for which the time range is calculated; and
    comparing a current file list with the stored file list, and if the both file lists are identical, displaying the time range in a hour/minute format using the stored data, while if the both file lists are different from each other, obtaining date and time information concerning the images only for a different file and recalculating the time range using at least one of the stored file list and time range.

9. A recording medium having stored thereon computer executable image management program for causing a computer to realize a function of displaying, on a display, information concerning folders in which image files are included, the image management program when executed causes a computer system to execute steps of:
    obtaining date and time information concerning images included in the folder;
    calculating a time range from an oldest image to a newest image in the folder according to the date and time information obtained by the obtaining function;
    displaying, on the display, date and time information indicating the time range calculated by the calculating function;
    realizing a mode for displaying an icon of the folder, the icon comprising: a representative image included in the folder and the information indicating the date and time range of the folder, wherein the representative image is extracted at a predetermined interval of the number of images included in the folder;
    storing data of the time range and a file list of the images included in the folder for which the time range is calculated; and
    comparing a current file list with the stored file list, and if the both file lists are identical, displaying the time range in a hour/minute format using the stored data, while if the both file lists are different from each other, obtaining date and time information concerning the images only for a different file and recalculating the time range using at least one of the stored file list and time range.

10. The image management program as defined in claim 9, wherein the date and time information is obtained from tag information recorded with the image files.

11. The image management program as defined in claim 9, wherein the date and time information is obtained from information concerning date and time of image file creation recorded automatically with the image files at creation of the image files.

12. The image management program as defined in claim 9, further comprising the function executed by the computer of creating a file in which at least date and time information is included.

13. The image management program as defined in claim 9, wherein the information indicating the time range is displayed in a main section on an icon of the folder.

14. The image management program as defined in claim 9, wherein the information indicating the time range is displayed in a tab portion on an icon of the folder.

15. The image management program as defined in claim 9, further comprising the function executed by the computer of displaying a representative image for each folder.

* * * * *